April 18, 1961 E. B. HITCHCOCK 2,980,230
CAN DIVIDER
Filed Feb. 5, 1958 2 Sheets-Sheet 1

INVENTOR.
EUGENE B. HITCHCOCK
BY
ATTORNEY

April 18, 1961   E. B. HITCHCOCK   2,980,230
CAN DIVIDER
Filed Feb. 5, 1958   2 Sheets-Sheet 2
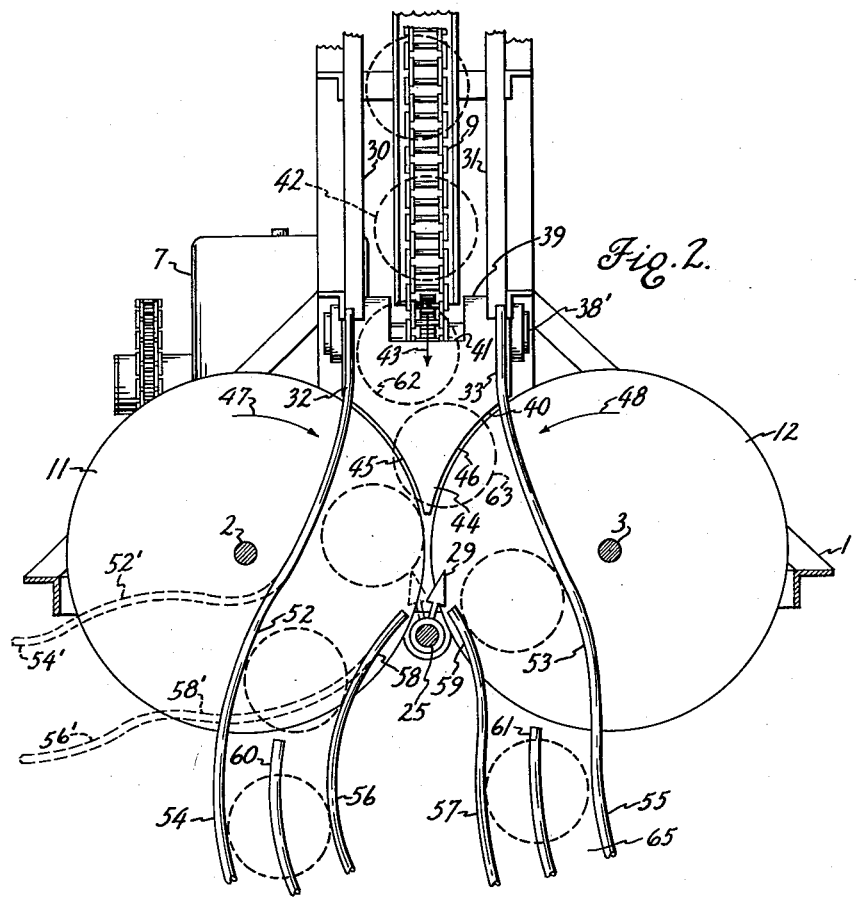
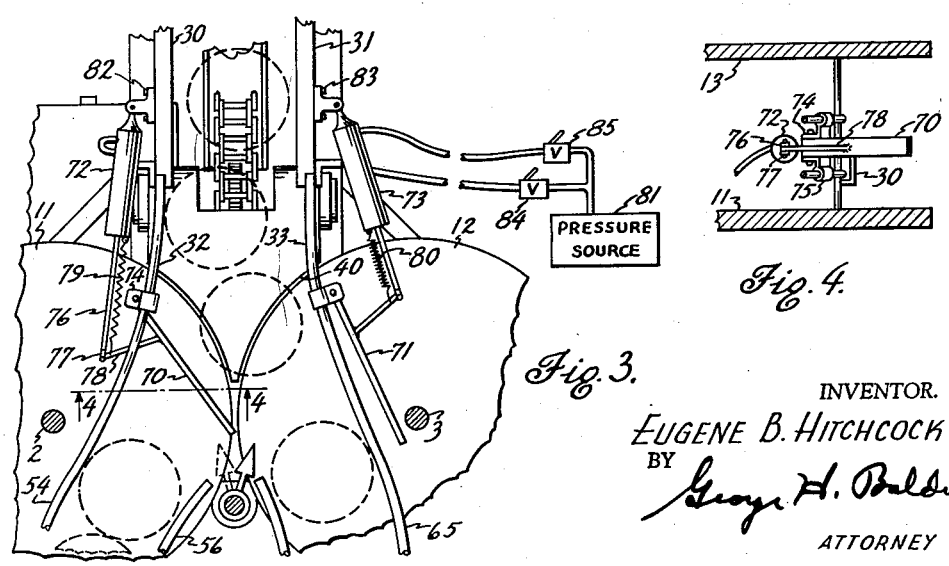
INVENTOR.
EUGENE B. HITCHCOCK
BY George H. Baldwin
ATTORNEY United States Patent Office 2,980,230
Patented Apr. 18, 1961

2,980,230
CAN DIVIDER
Eugene B. Hitchcock, Box 51, Longwood, Fla.
Filed Feb. 5, 1958, Ser. No. 713,451
9 Claims. (Cl. 198—31)

This invention pertains to can dividers, and, more particularly, to a machine for insertion into a can line for dividing cans moving in a single line into two lines.

A general object of the invention is to provide an improved can dividing machine.

A more specific object is to provide a can dividing machine which will operate at high speed, will receive cans from a single incoming line with random spacing and will supply the cans in unfailing alternation to two outgoing lines, which will operate without controls or attention from an operator, which will not jam, which will, if one outgoing line becomes filled with cans, continue to operate by delivering all of the incoming cans to the unfilled outgoing line until the filled line becomes again unfilled, and which will minimize the danger of damage to the cans.

Heretofore it has been customary to employ dividing mechanisms of star wheel or fishtail types, or comprising a pair of side by side toothed wheels, but such mechanisms are unsatisfactory at high speeds and tend to jam or to require speed controls when the rate at which cans are fed to the divider or the spacing of the cans being fed are not constant. It is a further object of this invention, accordingly, to provide a divider which, without any speed adjustment or other change, will operate satisfactorily even though the rate of supply varies abruptly, or stops entirely and then suddenly resumes the full rate.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 2 is a sectional top plan view taken generally along line 2—2 of Fig. 1 showing operative portions of the machine but omitting certain frame elements and the like for the sake of clarity;

Fig. 3 is a sectional top plan view corresponding to Fig. 2 and showing operative portions of a machine embodying additional features adapting it particularly to use with empty cans; and Fig. 4 is a fragmentary sectional view taken generally along line 4—4 of Fig. 3.

Figure 1:
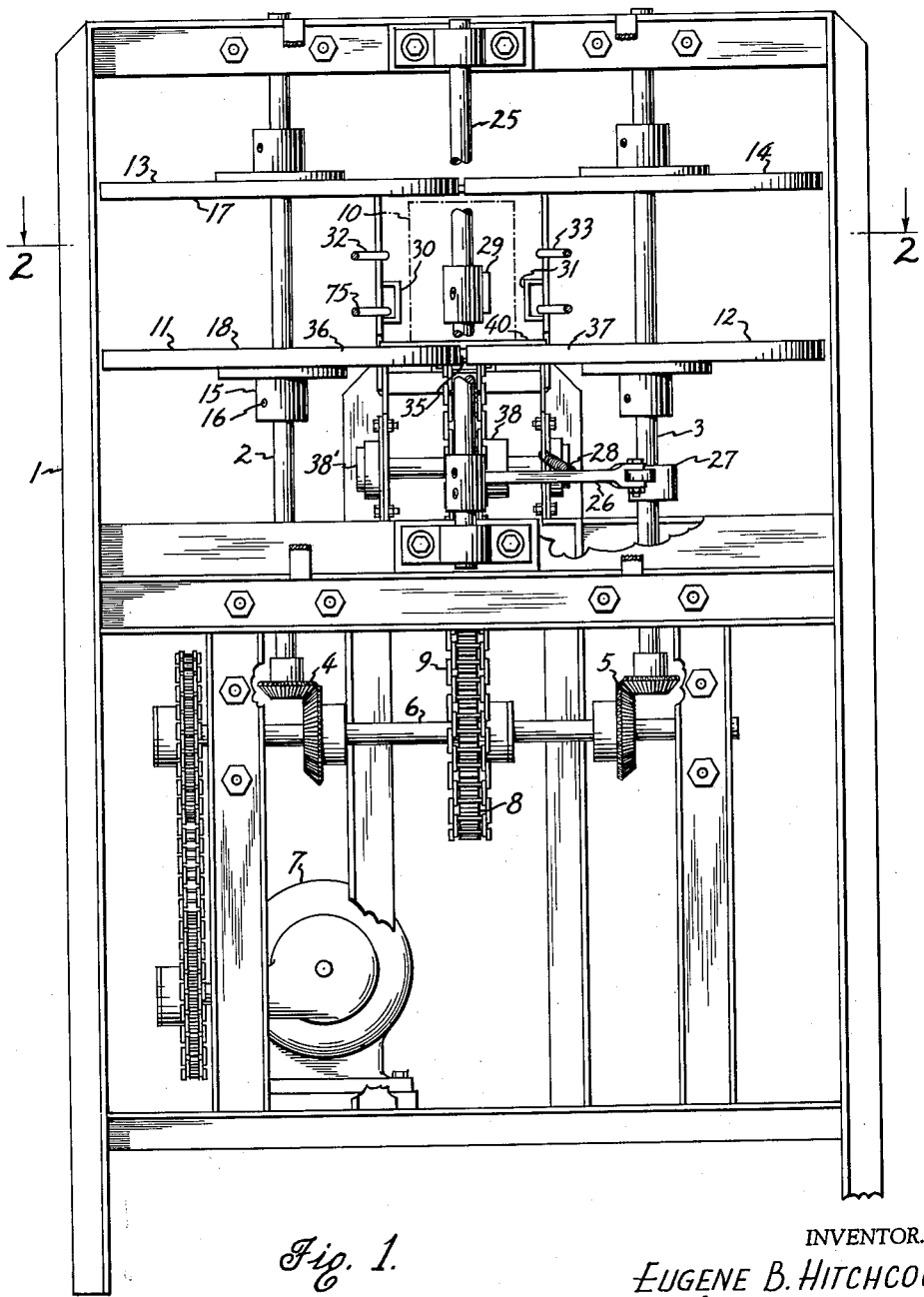
Fig. 1 is an elevation taken from the back or output side of a can dividing machine according to the invention.

As shown in Fig. 1, the machine comprises a frame 1 carrying two vertical rotatable shafts 2 and 3 each of which is connected through bevel gears at 4 and 5 respectively to a shaft 6 driven by a suitable motor 7. Shaft 6 carries a sprocket 8 drivingly engaging a can conveying chain 9 which feeds cans, such as can 10 indicated in broken lines, in a forward direction toward circular dividing and transporting discs or turntables 11 and 12, which are connected to shafts 2 and 3, respectively, for rotation therewith. In each case, a second turntable-like steadying disc element 13 and 14 is mounted on the shaft above the respective can-supporting turntable. Each of elements 11, 12, 13 and 14 comprises a flat surfaced disc, and each is rigidly connected by means of an integral collar and set screw, such as collar 15 and set screw 16, to its supporting shaft. The discs are so positioned along their shafts that the lower flat surface 17 of steadying disc 13 is parallel to the upper flat surface 18 of can transporting disc 11 and is spaced therefrom by a distance slightly greater than the height dimension of the cans to be divided. Thus the separation between disc surfaces 17 and 18 is equal to the can height dimension plus a small clearance distance of, for example, about one-eighth inch. It has been found that the clearance distance should be not larger than a small fraction of the can diameter, such as about one-eighth of the diameter. The clearance should be at least a few thousandths of an inch for the tallest can which may be encountered within the manufacturing tolerances of the can manufacturing or filling operations which have taken place before supplying the cans to the divider.

Also arranged on the frame is a rocking shaft 25 having a cam follower 26 connected rigidly thereto and engaging an eccentric cam 27 affixed on shaft 3 and rotatable therewith. A tension spring 28 connects to cam follower arm 26 to retain the arm in engagement with the cam. An agitator arm or blade 29 is fixed to rocking shaft 25 and swings back and forth to insure against any possibility of jamming of the cans.

The cans entering the machine are retained within side guides in the form of channel members 30 and 31, and guide rods, such as rods 32 and 33, are provided to define can paths through and out of the divider machine.

It will be apparent that the machine is, as to most elements, symmetrical with respect to a vertical plane which would pass midway between guides 32 and 33, midway between shafts 2 and 3, and through the point of closest approach 35 of the transporting disc peripheries 36 and 37. Only one motor 7 is provided, however, and this is conveniently mounted at one side as shown, and only one cam 27 and cam follower arm 26 is required and this, also, extends to one side of the machine.

An idler sprocket 38 on shaft 38' is arranged to guide the conveyor chain 9 at a level approximately the same as the level of the discs 11 and 12 and the level of a platform shown at 40 in Fig. 2. The platform 40 has a can receiving end 41 onto which cans are supplied by the conveyor chain 9. Channel member guides 30 and 31 extend alongside of the conveyor chain to retain the cans, which are represented by broken lines as at 42, approximately centered on the conveyor. The platform 40 extends in the direction in which the cans are supplied, as indicated by arrow 43, for a distance somewhat greater than the diameter of one can, and it terminates in a delivery or forward end 44 which is reduced in width so as generally to point toward the point 35 of nearest approach of the disc peripheries. The delivery end preferably takes the form of a ceratoid cusp and is proportioned to have respective arcuate edge portions 45 and 46 lying close to the peripheries of the discs 11 and 12, whereby cans slide from the platform to one or the other of the transporting discs without having to pass over a gap of a size large enough to catch and tip over a can. The discs rotate in a direction such that their peripheries are moving at point 35 in a forward direction, as indicated by arrow 43, away from platform 40. These directions of disc rotation are shown by arrows 47 and 48, respectively. The cans are thus transported forwardly and outwardly from the delivery end of the platform. Disc rotation, conveyor chain movement, and oscillation of agitator blade 29 are all caused by motor 7.

The channel member guides 30 and 31 are spaced apart by a less distance than guides 32 and 33 and terminate at, approximately, the receiving end 41 of platform 40, while side guides 32 and 33 are arranged to limit lateral deflection of the cans as they progress along the platform and are spaced, preferably, at least slightly further apart than guides 30 and 31, for at least a part of the length of the platform. The platform side guides 32 and 33 are, accordingly, spaced apart by a distance which is equal to more than the diameter of a can, but less than twice such diameter, whereas the conveyor side guides 30 and 31 may be spaced apart by a distance equal to the can diameter, plus a small clearance distance, or up to nearly equal the platform side guide spacing. Rod guides are also provided as shown to remove or clear the cans from each turntable in a desired path and such guides conveniently comprise rod portions 52 and 53 formed as extensions of and integral with the platform side guides 32 and 33, respectively. Guide rod portions 52 and 53 may further extend into can chute portions 54 and 55, respectively, and additional guide rods 56 and 57 are provided to define the sides of the leaving chutes opposite guides 54 and 55. At their portions 58 and 59, guides 56 and 57 delimit the path of the cans being transported on the discs and direct the cans around the disc, preventing the cans from being thrown off of the disc until the desired point is reached at which the can is to be directed off into a leaving chute or output path by the respective can clearing guide, such as guide 52 or 53. Rods 60 and 61 are provided in known manner exteriorly of the discs to form chute bottoms.

It will be apparent that the cans are carried by each turntable until they meet the clearing guide 52 or 53, and that the clearing guide position is determined by the direction in which it is desired to direct the cans upon leaving the respective turntable. Accordingly, if it is desired to deliver cans from turntable 11 further to the left as viewed in Fig. 2, for example, guides 52 and 58 may be formed into the shape suggested by broken lines 52' and 58', leading into a delivery chute 54', 56'.

In operation, cans are carried toward platform 40 by chain conveyor 9, meeting first a downwardly inclined lip portion 39 of receiving end 41 of the platform, which permits the cans to slide freely onto the platform being lifted just sufficiently to become disengaged from the chain 9. The cans, such as can 42, being carried by the conveyor are limited by guides 30 and 31 to a relatively narrow path. The can 62 which is on platform 40 has been deflected toward guide 32 by its having pushed the preceding can 63 along the platform while can 63 was in engagement with guide 33. Since the platform side guides 32 and 33 are spaced slightly further apart than conveyor guides 30 and 31, the next succeeding can 42, when it meets can 62, will be deflected toward guide 33, even if can 42 happened to be engaged against guide 30 when it reached the platform. Being forced onto the platform by the chain conveyor, can 42 will push can 62 along and can 62 will, accordingly, push can 63 further until it passes sufficiently onto disc 12 to be transported thereby toward guide 53 and chute 65. The length of time that can 62 remains on the platform before the next can 42 arrives to push it along is immaterial to the effective operation of the machine.

In order to insure against jamming, and to clear any jam as it occurs, agitator blade 29 swings back and forth between its full line position and its broken line position at 29'. The plate 29 is not timed with respect to the can feed rate, however, and does not even contact most of the cans which pass through the machine. If, however, some unusual circumstance results in a can moving toward shaft 25, rather than circularly outwardly on one of the turntables, the blade 29 in moving from side to side immediately or almost immediately causes the can to move onto one or the other turntable. Blade 29 is rarely needed, but, for example, if the first two or three cans supplied to the platform in starting a run happen to be exactly aligned, the first can might pass along the platform without being deflected laterally, or some external object or defect in one of the cans might so interfere with the operation as to cause such result. It will be noted that the length of blade 29 and its angle of swing are so limited as to permit cans to pass without being stopped by the blade under any circumstances, and it is an important feature of the arrangement that, if either of the outgoing chutes becomes filled, the cans entering the machine are all supplied into the chute which is still open. When the filled chute clears, the dividing machine automatically resumes its function of supplying the incoming cans alternately to the chutes.

The length of platform 40, between its ends 41 and 44, is greater than one can diameter whereby at least one can will remain substantially completely on the platform after it pushed the next preceding can onto one or the other turntable. The next can, accordingly, which must then push along the can already on the platform and at one side thereof, is deflected by that can toward the respectively opposite side of the platform, at the same time urging the first mentioned can not only forwardly but toward its one side of the platform and thence in a forward and lateral direction onto the appropriate corresponding disc. While the platform may be more than one can diameter in length, if it is long enough to permit a number of cans to remain on the platform, the force with which subsequent cans must be pushed onto the platform by the conveyor chain is increased, and it is therefore desirable that the platform should have a length equal to not more than about two can diameters.

The level of discs 11 and 12 is preferably just below the level of the platform, by an amount of, for example, a few thousandths of an inch or up to as much as about one-eighth of an inch. Accordingly, when slightly more than one-half of the base of a can projects over one or the other of arcuate edge portions 45 and 46, it tips very slightly and becomes engaged on the rotating turntable and tends to pivot onto the turntable and off of the platform.

The turntables may rotate at about 200 r.p.m., and, for frozen juice cans of about two inches diameter, the discs may be about twelve inches in diameter, to divide readily cans supplied at rates up to 2000 cans per minute.

Fig. 3 discloses a modification of the machine of Figs. 1 and 2 for adapting the machine particularly for use in connection with empty can lines, although the modification does not limit the utility of the machine in full can lines and, under some circumstances, the modified machine may be specifically useful in full can lines.

The modified machine is in all respects similar to the embodiment of Figs. 1 and 2 with the exception that there are added thereto a pair of deflecting blades 70 and 71 pivotally mounted to guide rods 32 and 33, respectively, and operating means for the blades, including air cylinders 72 and 73. A clamp 74 engages guide rod 32 and, as shown in Fig. 4, also engages lower guide rod 75, and pivotally mounts blade 70 for swinging into a deflecting position shown in Figs. 3 and 4, deflecting those cans which would otherwise be carried into the output line 54—56 onto disc 12 for direction into output path 65. Blade 70 is arranged approximately midway between the upper and lower discs 13 and 11. Air cylinder 72 is shown in Figs. 3 and 4 with its piston rod 76 extended and, through its pivotal connection at 77 with arm 78, integral with blade 70, forcing the blade pivotally into deflecting position against the bias of tension spring 79 which couples arm 78 with the clyinder 72 and which, accordingly, tends to retain blade 70 in retracted position out of contact with the cans. The arm 71 is shown in Fig. 3 in its retracted position, in which it is normally retained by spring 80 until compressed air may be introduced by means of air supply 81.

Each of cylinders 72 and 73 is mounted by means of a pivot bracket 82, 83 to a convenient portion of the machine, such as to guide rails 30 and 31, respectively, as shown.

It will be apparent that admission of air under pressure to either cylinder will cause the respective blade to stop the supply of cans to the corresponding output path, and that supplying air to both cylinders will stop the passage of cans into both output paths, causing incoming cans to back up on the input conveyor. Control of the air supply to the cylinders is controlled by valves 84 and 85 which may be manually operated or operated by contact with cans in the respective output paths, whereby, for example, if path 54—56 fills with cans due to a stoppage of some can filling machine along this path, valve 84 is automatically or manually opened to supply air to cylinder 72 thereby to swing deflector blade 70 into the interrupting position shown in Figs. 3 and 4.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A can dividing machine having an input side and an output side, a can receiving stationary platform at the input side having a receiving end and a delivery end, conveyor means for supplying cans to said receiving end of said platform, a pair of laterally spaced can guides confining the cans delivered to said platform to a path extending from said receiving end to said delivery end and said path having a width between the guides greater than the diameter of one can and less than twice such diameter, the cans being pushed in sequence along said path by following cans supplied by said conveyor and alternating in position toward one and the other side of said path, a pair of circular turntables having vertical axes spaced equally toward opposite sides of said path and beyond the delivery end of said platform, the circumferential peripheries of said turntables approaching closest to each other at a point beyond said delivery end, the delivery end of said platform being generally ceratoid cuspate and extending toward said point of closest approach of said turntables and having opposite arcuate edges immediately adjacent said peripheries, means for rotating said turntables in the respectively opposite directions necessary to transport cans pushed thereonto forwardly away from said platform, and means to direct the cans from each said turntable into two respective output paths.

2. A dividing machine for cylindrical cans comprising a platform having a delivery end and a receiving end extending horizontally in a predetermined direction from said receiving end to said delivery end, a pair of horizontal transporting discs, means to force cans in upright position sequentially onto said receiving end whereby each can is pushed along said platform generally in said direction by the next succeeding can, a pair of side guides spaced by a distance equal to more than one can diameter and less than twice such diameter and disposed to extend along and above said platform from said receiving end to and beyond said delivery end for contact with said cans limiting the extent of lateral displacement from a path in said direction of the cans progressing along said platform and onto said discs, said discs having respective rotational axes spaced equally and oppositely laterally from said path and having peripheries which are adjacent at a point lying along said direction and said platform being narrowed decreasing in width and extending between portions of said peripheries and toward said point at its said delivery end, means for rotating said discs in a direction of rotation corresponding to movement of the peripheries at said point in said direction, whereby successive cans are deflected on said platform alternately into contact with said guides and pass alternately from said platform onto one and the other of said discs and are transported by the respective disc forwardly and outwardly from said point.

3. A can dividing machine comprising a horizontal platform having a receiving end and a delivery end, a conveyor for moving cans in a forward direction toward and for urging the cans sequentially onto the receiving end of said platform, whereby each can deposited on said platform at its receiving end is pushed forwardly along the platform by the succeeding can toward said delivery end, a pair of side by side horizontal discs having their respective peripheries closely adjacent each other at a point located in said forward direction from the platform and the platform extending at its delivery end between said peripheries and toward said point, side guide means extending parallel to said direction limiting lateral displacement of each can on said platform to a path having a width equal to less than twice the diametrical dimension of the cans, said guides extending from said receiving end toward said delivery end and effectively terminating a short distance beyond the disc peripheries thereby to permit the cans to move laterally onto said discs into separate divergent paths after leaving said delivery end, means to rotate each said disc in the direction to cause its periphery to move in said forward direction at said point, and respective means to clear from each of said discs the cans deposited thereon from said platform.

4. A dividing machine for cylindrical cans comprising, a pair of flat, horizontal discs disposed side by side and having peripheries immediately adjacent one another at a predetermined point, a stationary platform having a can receiving end and a pointed delivery end forwardly of said receiving end, said pointed end being directed forwardly toward said predetermined point and said platform being centered with respect to said discs, means for forcing cans in upright position one after another onto said receiving end of said platform whereby each succeeding can pushes the preceding can forwardly on said platform toward said point and deflects the preceding can in a lateral direction and is deflected by the preceding can in the opposite lateral direction, side guide means for the cans defining a can path from one to the other of said platform ends spaced to limit the lateral deflection of said cans to a path having a width dimension equal to approximately one and one-half times the diameter of said cans, said path having a length dimension equal to more than one can diameter, means for rotating said discs in respective directions of rotation to transport cans received thereon from said delivery end generally forwardly and outwardly therefrom, and respective means to remove said transported cans from each of said discs and to direct the cans from each said disc into a respective outgoing path.

5. Handling apparatus for cylindrical cans comprising a plurality of side guide rails defining a first can path and two branch can paths branching therefrom, said first can path having a portion adjacent said branch of which the width defined by said guide rails is equal to at least about one and one-half times and less than twice the diametrical dimension of said cans, a stationary platform underlying and supporting the cans at said portion of said first path, said first path having a second portion extending forwardly to said first portion, conveyor means at said second portion for conveying cans forwardly in sequence thereto and onto said platform, a pair of side by side turntables having their peripheries adjacent at a point forward of said platform and flat upper surfaces arranged to receive cans thereon from said platform, said first can path of less than twice said diametrical dimension extending onto said turntables and said branches joining said first path forwardly of said platform at substantially said point, said branches extending respectively from said turntables and each receiving cans from a respective one of said turntables.

6. The combination according to claim 5 wherein a deflector blade is swingably mounted to said guide rails between said platform and one of said branch can paths, means are provided for swinging said blade into a blocking position across said one branch path thereby to deflect cans into the other branch path and alternatively and selectively for retracting said blade out of its said blocking position thereby to reopen said one branch path to receive cans, and remote actuating means are provided for actuating said blade swinging means.

7. A dividing machine for cylindrical cans comprising a platform having a delivery end and a receiving end extending horizontally in a predetermined direction from said receiving end to said delivery end, a pair of horizontal transporting discs, means to force cans in upright position sequentially onto said receiving end whereby each can is pushed along said platform generally in said direction by the next succeeding can, a pair of side guides spaced by a distance equal to more than one can diameter and less than twice such diameter and disposed to extend along and above said platform from said receiving end to and beyond said delivery end for contact with said cans limiting the extent of lateral displacement from a path in said direction of the cans progressing along said platform and onto said discs, said discs having respective rotational axes spaced equally and oppositely laterally from said path and having peripheries which are adjacent at a point lying along said direction and said platform being narrowed decreasing in width and extending between portions of said peripheries and toward said point at its said delivery end, means for rotating said discs in a direction of rotation corresponding to movement of the peripheries at said point in said direction, whereby successive cans are deflected on said platform alternately into contact with said guides and pass alternately from said platform onto one and the other of said discs and are transported by the respective disc forwardly and outwardly from said point, and a respective upper disc for each of said transporting discs, disposed horizontally and rotatable with and spaced above its respective transporting disc a distance equal to the height dimension of said cans plus a small clearance dimension.

8. A can dividing machine comprising a horizontal platform having a receiving end and a delivery end, a conveyor for moving cans in a forward direction toward and for urging the cans sequentially onto the receiving end of said platform, whereby each can deposited on said platform at its receiving end is pushed forwardly along the platform by the succeeding can toward said delivery end, a pair of transporting surface elements having horizontal surfaces substantially in the plane of said platform and disposed on opposite sides thereof and extending generally forwardly and divergently outwardly from the delivery end of said platform, means to move said elements forwardly and divergently outwardly from said delivery end whereby cans received thereon from said platform are transported therefrom, a dividing element beyond and pointing toward said delivery end and disposed between said surface elements, and can guide means along said surface elements and defining limited paths for cans leaving said platform, guide means along said platform diverging from a spacing equal to less than twice the diameter of one can at said receiving end to a spacing greater than twice the diameter of one can in front of said dividing element, whereby when one of said paths fills and the cans therein stop, the incoming cans move continuously into the other of said paths.

9. The combination according to claim 8 wherein each of said elements is moved by said moving means along said limited paths at a speed at least substantially as great as the speed at which cans are delivered to said receiving end of said platform.

References Cited in the file of this patent
UNITED STATES PATENTS

| | | |
|---|---|---|
| 1,457,364 | Hallock | June 5, 1923 |
| 2,671,568 | Hunt | Mar. 9, 1954 |
| 2,771,981 | McKune | Nov. 27, 1956 |
| 2,819,786 | Walters | Jan. 14, 1958 |

FOREIGN PATENTS

| | | |
|---|---|---|
| 682,520 | Great Britain | Nov. 12, 1952 |